A. L. CHEAK.
SOAP DISH.
APPLICATION FILED FEB. 15, 1921.
1,380,288. Patented May 31, 1921.
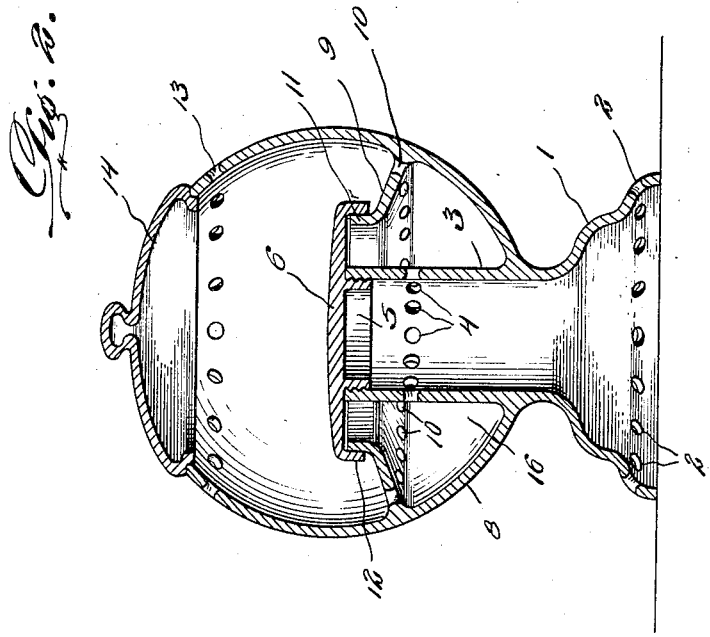
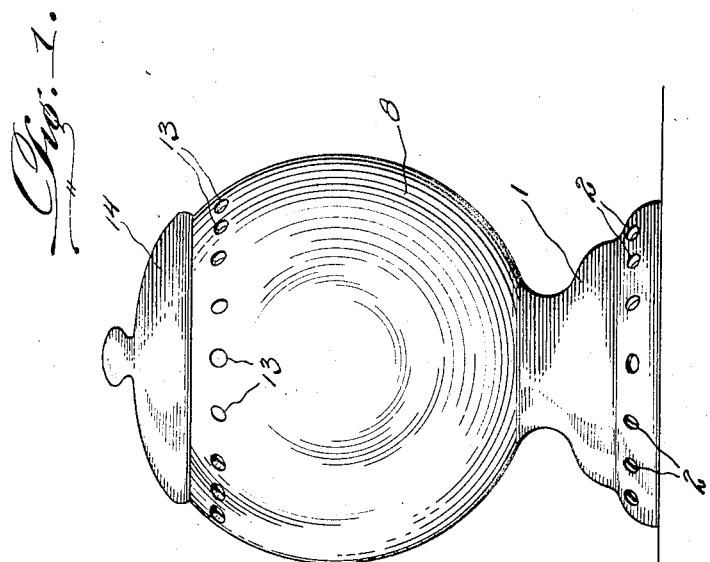
Amy L. Cheak,
INVENTOR

UNITED STATES PATENT OFFICE.

AMY LEATHERS CHEAK, OF WADDY, KENTUCKY.

SOAP-DISH.

1,380,288. Specification of Letters Patent. Patented May 31, 1921.

Application filed February 15, 1921. Serial No. 445,293.

*To all whom it may concern:*

Be it known that I, AMY LEATHERS CHEAK, a citizen of the United States, residing at Waddy, in the county of Shelby and State of Kentucky, have invented new and useful Improvements in Soap-Dishes, of which the following is a specification.

My present invention has reference to a soap receptacle.

The object of the invention is the provision of a soap dish or holder in which the drippings from a wet cake of soap are received in a suitable compartment therein, the device being provided with air openings whereby a sufficient amount of air can enter the soap receptacle and mixing with the water therein will retain the cake of soap in a dry unhardened condition.

The foregoing, and other objects which will appear as the nature of the invention is better understood, may be accomplished by a construction, combination and operative arrangement of parts, such as is disclosed by the drawings which accompany and which form part of this application.

In the drawings:—

Figure 1 is an elevation of a soap dish or holder constructed in accordance with this invention.

Fig. 2 is an approximately central vertical longitudinal sectional view through the improvement.

The improved soap dish or holder is constructed of any desired material and may be ornamented. The improvement includes a hollow base 1, that is preferably cylindrical in cross section and which has, adjacent its lower and outwardly rounded bottom portion a series of apertures 2 that provide air inlets. On the base there is a tubular extension 3, that, adjacent to its upper end, is provided with air apertures 4. Preferably the tubular member 3 is interiorly threaded at its upper or outer end to receive thereon an inner annular threaded flange 5 on a disk 6. The disk provides the holding element for the cake of soap.

Integrally formed with the tube 3, adjacent to its connection with the base 1, is a globular bowl 8. This bowl is interiorly provided with an inwardly directed upwardly flared flange 9, the said flange, near its connection with the bowl having spaced air inlet apertures 10 therethrough. The flange, at its inner end is formed with an upstanding flange 11 that is designed to engage with a downturned flange 12 that is peripherally formed on the disk 6. The bowl 8, adjacent to the open top thereof is provided with a series of air inlet apertures 13, and the said top is closed by a removable cover 14.

The soap rests on the disk or holder 6. The moisture therefrom will pass through the spaces 15 between the lugs or flanges 7, and on to the inclined flange or partition 9, through the apertures 10 therein into the water receptacle 16 that is provided between the bottom of the bowl and the tube 3. Air is admitted to the water chamber 16 through the apertures 2 in the base 1 and the apertures 4 in the tube 3. This moisture is also delivered through the apertures 10 in the inclined or flared partition 9 to the upper portion of the bowl, and to the soap when the same is arranged on the holder. Also air is admitted through the apertures 13, the said apertures also serving as outlets for the air which is already in the bowl. Thus it will be noted that a continuous circulation of air is provided for, and consequently soap is prevented from hardening. The holder 7 may be readily removed from the tube and partition, and by removing the cover the water receptacle may be drained.

It is thought that the foregoing description, when taken in connection with the drawings will fully set forth the construction and advantages of the improvement to those skilled in the art to which such inventions relate, and therefore further detailed description will not be attempted.

Having described the invention, I claim:—

1. In a soap holder, an apertured base having a tubular extension, a globular body integrally formed on and surrounding the extension, said body having a partition directed upwardly and toward but spaced from the upper end of the tubular member, a soap holder removably connected to the end of the tubular member and resting on the partition, and said body partition, tubular member and base having air inlet apertures.

2. In a device for the purpose set forth, a hollow apertured base having a reduced centrally arranged tubular extension, apertured adjacent to the outer end thereof and having its said outer end threaded, a globular body integrally formed on the tube and inclosing the upper end thereof, said body having an upper open end and having apertures adjacent said end, a closure for the open portion of the body, an upwardly inclined angularly disposed apertured partition in the body having a straight flange which terminates in a line with the upper end of the tube, a disk having a central annular threaded flange to engage with the threads of the disk, and said disk having a peripheral flange which is arranged over the flange of the partition.

In testimony whereof I affix my signature.

Mrs. AMY LEATHERS CHEAK.